Patented Mar. 19, 1935

1,995,247

UNITED STATES PATENT OFFICE 1,995,247

MATERIAL FOR REPELLING INSECTS

Berthold Günther Haring, Valparaiso, Chile, assignor, by direct and mesne assignments, to Hermann Wilhelm Haring, Gerbstedt, Germany No Drawing. Application June 15, 1933, Serial No. 676,021. In Germany August 23, 1932

8 Claims. (Cl. 167—33)

The invention concerns a material for repelling insects.

For the warding off of flies, midges, bugs, mosquitoes, moths and other unpleasant insects, volatile more or less pungent smelling materials have already been proposed. These materials were either dissolved in a solvent material such for example as a middle petroleum fraction and sprayed or atomized, or they were mixed in ointments, emulsified in water and thus brought to a form suitable for use in dependence upon the manner of their employment.

For a good and permanently acting insect repelling material it is required that, in the proportions in which it is to be used, it is substantially harmless to humans and animals, that it is not unpleasantly or pungently smelling and that it has no corrosive action and it should not attack the human skin, particularly the mucous membrane of the respiratory organs, nor, as far as concerns objects, should it attack textile materials, metal and the like. Concurrent with these properties, the material should ward off insects with certainty and should retain its activity at least 10 to 12 hours in order for example that it shall remain active during the whole of a tropical night. With the known materials which have long been used, these requirements have not been united and substances as, for example, terpinyl fatty acid esters such as terpinyl acetate, terpinyl formate and the like, although they indeed show a good activity in warding off insects have, however, such volatility that even after a short time, at most even after 2 to 3 hours, they become inactive. Such substances are in particular not suitable as reliable repelling agents against disease producers which are transferred by insects to humans and animals while sleeping during the night.

According to the invention, the insufficiency hitherto existing is overcome and a material for repelling insects or the like is provided which consists of derivatives or homologues of condensation products of unsaturated organic oxyacids. The substance can contain halogen substitution products of aromatic lactones such as cumarin, or its derivatives or homologues, and it has been found particularly suitable to employ cumarin substituted in the pyrone ring for example 4-fluorcumarin, 7-methylcumarin or the like.

The means according to the invention can be employed in proportions of 1 to 50% or above with a suitable carrier for example an organic solvent material or an aqueous emulsion, and may be utilized in semi-solid materials such as salves, skin creams, jellies or in oils or soaps.

According to the invention for example a product to be rubbed in for protection against the incursions of insects transmitting parasites, may be constituted in the form of the following salve:

| | Per cent |
|---|---|
| 4-fluorcumarin | 5 |
| Wool fat | 35 |
| Petroleum jelly | 48 |
| Paraffin | 7 |
| Water | 5 |

Naturally in the same way also other known salve bases such as carnauba wax, ceresin, gelatine, glycerine, animal fat, if desired also with other additions, can be employed. If the skin is smeared with such a salve a satisfactory protection against the onset of insects is obtained, as has been shown by extended practical investigation, for a longer period and indeed for at least 10 to 12 hours.

The action of the insect repelling materials according to the invention is maintained also over the whole of a tropical night, and it is an extraordinarily valuable and active agent for warding off insects transmitting the agencies responsible for disease. Thus, according to the invention numerous varieties of spirochaete can be warded off such as spirochaete obermeieri which is transmitted from bugs or ticks or other spirochaete such as trypanosome gambiense, which is transmitted by stinging midges, in particular of the anophele variety, trypanosome brucii, trypanosome thieleri, trypanosome vivax and the like. The transmission of malaria and other diseases such as yellow fever, elephantiasis and the like which are transmitted by insects in which normally the copulation of the parasites occurs is effectively prevented by the new material.

The insect repelling material according to the invention can, however, be employed also in other forms for example in solution, when it is to serve for washing or for spraying in living rooms for humans and animals, for protection of clothes and carpets and the like against damage due to moth, or for protection of foodstuffs and the like against the introduction of parasites. It has also been found that the new material exerts a good insecticidal activity in the combating of plant pests.

Such a solution for example can be obtained from

| | Per cent |
|---|---|
| 6-methylcumarin | 4 |
| Alcohol | 96 |

The insect repelling material according to the invention can also be employed in the form of an aqueous emulsion which can be obtained with sulpho-compounds such as turkey red oil or phosphatides or other emulsifying agents as dispersing materials.

Also the material according to the invention may be dissolved in an oil for example in paraffin oil or a fatty oil and can thus serve for rubbing in. In this way the condensation products are according to the invention not absorbed or consumed by the human body but remain as an outer coating which repels the insects.

Moreover, the repelling material according to the invention can be added to washing materials or to bath water and can be employed in the form of a skin cream, soap, cosmetic powder or the like.

The content of condensation product according to the invention depends essentially upon the intended degree of activity and can vary in considerable degree. Thus, in a spraying or washing material less than 1% suffices and in a salve or in an oil for rubbing in it may be even above 50% of the mixture.

Pure cumarin in alcohol solution has already been proposed for the warding off of moths. This process has, however, not been widely introduced into practice since the insecticidal action of pure cumarin does not suffice to meet the requirements. The surprising observation was made that homologues or derivatives of cumarin have an insecticidal action which far surpass that of pure cumarin.

The following halogen substitution products have been found to be particularly suitable:

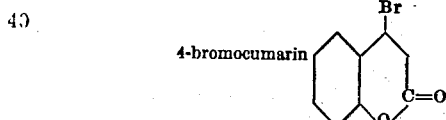
4-bromocumarin

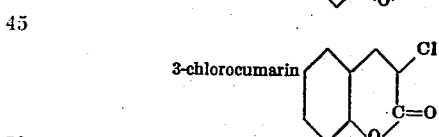
3-chlorocumarin

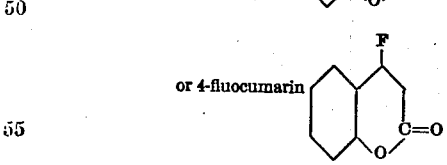
or 4-fluocumarin and further alkyl or aryl substitution products such as

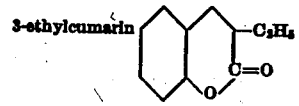
3-ethylcumarin

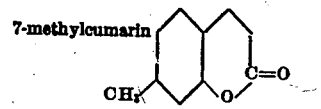
7-methylcumarin

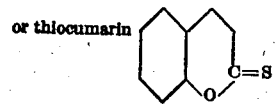
or thiocumarin

These materials are readily prepared in known manner and they constitute, as extended practical investigation has shown, satisfactory insect repelling agents of outstanding activity which are particularly suitable as preventive against the transference of malaria, and in outstanding manner for the warding off of flies, moths, midges, bugs and other insects.

I claim:

1. An insect repellent comprising a substitution product of cumarin.
2. An insect repellent comprising a substituted cumarin selected from the group which consists of a halogen substituted cumarin, a cumarin containing an alkyl substituent, and thiocumarin.
3. An insect repellent comprising a halogen substitution product of cumarin.
4. An insect repellent comprising cumarin substituted in the pyrone ring thereof by a halogen.
5. An insect repellent comprising cumarin containing a fluorine substituent.
6. An insect repellent comprising an alkyl substitution product of cumarin.
7. An insect repellent comprising thiocumarin.
8. An insect repellent comprising a substituted cumarin of the following general formula,

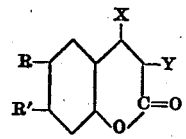

where R and R' represent respectively hydrogen or an alkyl radical, X represents hydrogen or a halogen atom, and Y represents hydrogen, an alkyl group, or a halogen atom, at least one of said substituents being other than hydrogen.

BERTHOLD GÜNTHER HARING.